United States Patent Office 3,533,821
Patented Oct. 13, 1970

3,533,821
TALC TREATMENT AND TALC CONTAINING PIGMENTS
John D. Lundquist, Clark, N.J., assignor to Georgia Kaolin Company, a corporation of New Jersey
No Drawing. Filed Mar. 24, 1967, Ser. No. 625,633
Int. Cl. C09c 1/02, 1/28
U.S. Cl. 106—306                                2 Claims

ABSTRACT OF THE DISCLOSURE

A method of treating talc to improve its brightness by the steps of grinding, slurrying, treating to acid pH, filtering, washing and calcining either alone or in admixture with kaolin.

This invention relates to talc treatment and talc containing pigments and particularly to a method of treating talc to improve its brightness and a pigment containing talc of unique properties as a pigment for paint and the like.

There are large deposits of talc throughout the world which have a very low brightness e.g. 65 or less and which contain calcium carbonate and organic material. These talcs have little commercial utility because of the presence of calcium carbonate and because of their poor color which is usually a gray of low brightness.

I have found a method of treating such low brightness gray talcs which will eliminate the gray color, the undesirable calcium carbonate and will raise the brightness to a level equal to that of the best natural white talcs.

I have found that if these talcs are ground, slurried, treated with sulfate ion to a constant pH on the acid side, filtered, washed and calcined either alone or in admixture with kaolin I can produce a product having a brightness equal to that of natural white talcs.

Preferably, I slurry the talc after grinding the talc to a size between 200 and 325 mesh and then add either sulfuric acid or a mixture of acid and alum $$[Al_2(SO_4)_3 — 18H_2O]$$

to provide sulfate ion in the slurry. Calcining is preferably carried out at about 1050° F. for one hour.

In the foregoing general description of my invention I have set out certain objects, purposes and advantages. However, other objects, purposes and advantages will become apparent from the following examples.

EXAMPLE I

A crude Texas talc having a gray color and a brightness of 65 was ground to the size range 200–325 mesh. The ground talc was slurried in water to form a slurry of about 25% solids. The slurry was then treated with a solution of $H_2SO_4$+alum (50–50) to an equilibrium pH, which is in the range 4–7. The treated talc was then filtered, washed and dried and thereafter calcined for one hour at 1050° F. The calcined talc was quenched in water, ground to remove agglomerates and screened through a 200 mesh screen, dried and pulverized. The final product had a brightness of 94–96% at 457 m$\mu$ relative to a smoked magnesium oxide block.

EXAMPLE II

The same Texas talc ground to 200–325 mesh as in Example I was slurried in water to 25% solids and treated with 1—1 $H_2SO_4$ to an equilibrium pH which is in the range of 4–7. A Georgia kaolin of 0.55 micron average particle size having a brightness of 87–90 was slurried to 25% solids. Kaolin with average particle sizes other than 0.55 micron could also be used with similar results. The two slurries were blended in the ratio of 20% talc to 80% by weight kaolin on dry basis. The blended slurry was filtered, washed and dried, pulverized and calcined for one hour at 1050° F. The calcined product was quenched in water, ground to remove agglomerates, passed through a 200 mesh screen, filtered, dried and pulverized. The final product had a brightness of 96 to 98%, which is surprisingly high since the same clay calcined had a brightness of 90–92% and the treated talc (Example I) had a brightness of 94–96%. The average particle size of the blend was 4 microns whereas that of the clay after calcination and pulverization was 0.9–1.8 microns. While I have used a ratio of 20% talc to 80% kaolin in this example, I have used as much as 50% talc to 50% kaolin with similar results.

The product of Example I was formulated into a paint vehicle and compared with New York State Talc (untreated) and the same New York State Talc (treated by the process of this invention precisely as in Example I). The results appear in Table I.

TABLE I

|  | Texas Talc (treated) | New York Talc (untreated) | New York Talc (treated) |
|---|---|---|---|
| Percent reflectance | 92–93 | 89–90 | 90–91 |
| Contrast ratio | 0.95–0.98 | 0.96 | 0.96 |
| Yellowness | 0.02–0.03 | 0.02 | 0.02 |
| Gloss | 1.2 | 2.0 | 2.0 |
| Sheen | 1 max. | 0.5–1.0 | 0.5 |
| Holdout | (1) | (2) | (3) |
| Viscosity stability | (3) | (4) | (1) |
| Dry pigment brightness, percent | 94–96 | 89–90 | 95–96 |

[1] Fair.
[2] Excellent.
[3] Good.
[4] Extremely poor.

From the foregoing table, it can be seen that even a good, naturally bright talc such as New York State can be much improved by my process.

The product of Example II was formulated into a paint vehicle and compared with calcined clay and water washed clay, both frequently used as pigments. The results appear in Table II.

TABLE II

|  | Example II Blend | Calcined clay | Water-wash clay |
|---|---|---|---|
| Percent reflectance | 92–93 | 90–91 | 87–89 |
| Contrast ratio | 0.98–0.99 | 0.96–0.97 | 0.92–0.96 |
| Yellowness | 0.01–0.02 | 0.02–0.03 | 0.04–0.00 |
| Gloss | 1–2 | 2–3 | 5–9 |
| Sheen | 1–2 | 3–5 | 10–24 |
| Holdout | (1) | (2) | (3) |
| Viscosity stability | (4) | (4) | (4) |

[1] Fair-good.
[2] Poor.
[3] Fair.
[4] Good.

The paint formulations were made up as follows:

TYPICAL FORMULATION

|  | Pounds | Gallons |
|---|---|---|
| Pigment dispersion phase: |  |  |
| Rutile $TiO_2$ | 200 | 6.02 |
| Treated talc | 328 | 15.12 |
| KTTP | 1.0 | |
| Organic wetting agent | 6.0 | 0.71 |
| Bactericide | 1.0 | 0.09 |
| Antifoam agent | 2.0 | 0.32 |
| Carbitol acetate | 10.0 | 1.19 |
| Ethylene glycol | 25.0 | 2.69 |
| Water as required | | |
| Let-down phase: | | |
| 2% Solution hydroxyl ethyl cellulose | 150.0 | 18.00 |
| Polyvinyl acetate copolymer emulsion | 273.0 | 30.00 |
| Total water | 254.0 | 30.49 |
| Antifoam agent | 1.0 | 0.16 |
| $NH_4OH$ (28%) | 3.0 | |
| Total | 1,253.0 | 104.79 |

The same improved results are obtained with other paint formulations.

While the foregoing examples are based on the use of sulfuric acid and mixtures of sulfuric acid and alum, similar improvements in the talc can be obtained by the introduction of chloride or phosphate ion by introduction of HCl or $H_3PO_4$ in place of $H_2SO_4$.

In the practice of my invention I have found that talc containing pigments formed by adding to a slurry of talc an aqueous slurry of kaolin in the weight proportion of 75–80% kaolin to about 20–25% talc on the dry basis are a highly satisfactory bright pigment.

In the foregoing specification, I have set out certain preferred practices and embodiments of my invention, however, it will be understood that this invention may be otherwise embodied within the scope of the following claims.

I claim:
1. The method of forming a talc containing pigment comprising the steps of grinding talc to about 200 to 325 mesh, forming an aqueous slurry of said ground talc, treating said slurry with a compound providing in solution a sulfate ion to a constant pH in the range 4–7, adding to said acidified slurry of talc an aqueous slurry of kaolin in the weight proportion of 75–80% kaolin to about 20–25% talc in the dry basis, filtering and washing the blended slurry, calcining the filtered solids, quenching the calcined solids in water, drying said solids and pulverizing.

2. A product produced by the process of claim 1.

References Cited

UNITED STATES PATENTS

| | | | |
|---|---|---|---|
| 2,920,974 | 1/1960 | Allen | 106—306 |
| 2,943,971 | 7/1960 | Taylor. | |
| 3,366,501 | 1/1968 | Lamar | 106—306 |

JAMES E. POER, Primary Examiner

U.S. Cl. X.R.

106—288, 309

UNITED STATES PATENT OFFICE
CERTIFICATE OF CORRECTION

Patent No. 3,533,821                                          October 13, 1970

John D. Lundquist

It is certified that error appears in the above identified patent and that said Letters Patent are hereby corrected as shown below:

Column 2, Table I, under the heading "Texas Talc (Treated), line 29, "1.2" should read -- 1-2 --; Table II, under the heading "Water-wash clay", line 46, "0.92-0.96" should read -- 0.92-0.94 --; next line, "0.04-0.00" should read -- 0.04-0.06 --; next line, "5-9" should read -- 5-6 --; next line "10-24" should read -- 10-20 --.

Signed and sealed this 6th day of April 1971.

(SEAL)
Attest:

EDWARD M. FLETCHER, JR.                          WILLIAM E. SCHUYLER, JR.
Attesting Officer                                         Commissioner of Patents